3,311,653
GLYCOL BORATE AMINE SALTS
Richard J. De Gray, South Euclid, and Sarah H. Belden, Beachwood, Ohio, assignors to The Standard Oil Company, Cleveland, Ohio, a corporation of Ohio
No Drawing. Filed Aug. 1, 1963, Ser. No. 299,191
2 Claims. (Cl. 260—462)

This invention relates to novel glycol borate amine salts and more particularly to alkylene glycol borate cyclobutane-1,2-bis(methylene amine) salts.

The invention also relates to the use of the novel salts as hydrocarbon soluble microbicides.

The compounds of this invention have the formulas:

(I)
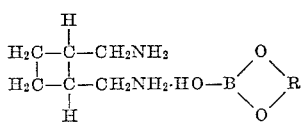

where R is an alpha or beta alkylene of 2–20 carbon atoms; and (II)
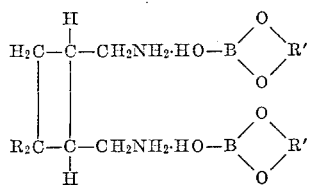

where R' is an alpha or beta alkylene of 2–20 carbon atoms, and may be the same or different in the two occurrences.

The mono-salts represented by Formula I are prepared by reacting one mole of a 1:1 molar alkylene glycol borate with one mole of cyclobutane-1,2-bis(methylene pared by reacting two moles of a 1:1 molar alkylene glycol borate with one mole of cyclobutane-1,2-bis(methylene amine). In some instances, it may be desirable to start with a 2:2 molar glycol borate, react this with water to form the 1:1 molar compound and then react the 1:1 molar compound with the diamine in the proportions indicated.

The preparation of 1:1 and 2:2 molar alkylene glycol borates is well known in the art and forms no part of the present invention. Conventionally, the preparation involves the reaction of stoichiometric quantities of alkylene glycol with orthoboric acid or boric oxide with the removal of the water of reaction.

The compound cyclobutane-1,2-bis(methylene amine) together with the process for making same are disclosed in co-pending application S. N. 229,200 filed October 8, 1962, now abandoned, and assigned to the assignee of the present case. This co-pending application is incorporated herein by reference to the extent necessary for a complete understanding of the diamine compound disclosed therein and the process for making same.

In forming the amine salts of the present invention, if the glycol borate used is a liquid, the reaction with cyclobutane - 1,2 - bis(methylene amine) proceeds spontaneously. If the glycol borate is a solid, the mixed reagents may be heated to the melting point of the glycol borate or dissolved in an inert solvent to provide a homogeneous reaction medium. Suitable solvents include dioxane, benzene, toluene, the xylenes and ketones.

To protect the alkaline diamine from reacting with carbon dioxide in the air forming insoluble carbonates, the salt forming process should be conducted under a blanket of inert gas such as nitrogen.

The invention can be further illustrated by the following examples:

EXAMPLE I 10.7 grams (0.05 moles) of 2:2 molar 1,3-butylene glycol borate was admixed with a sufficient amount of toluene to provide a 6.4 molar boron solution.

To this was added 0.9 grams (0.05 moles) of water, which reacted with the 2:2 molar glycol borate to form 0.1 moles of the corresponding 1:1 molar compound.

11.4 grams (0.1 moles) of cyclobutane-1,2-bis(methylene amine) was added to the glycol borate-toluene solution with stirring and under a nitrogen blanket. The reaction proceeded spontaneously with the evolution of heat. The resulting mono-salt, a clear, straw yellow liquid, was completely soluble in toluene at room temperature.

EXAMPLE II 17.2 grams (0.1 moles) of 1:1 molar 2,2,4-trimethyl pentanediol-1,3 borate was admixed with about 50 mls. of toluene. To this was added with stirring and under a nitrogen blanket, 11.4 grams (0.1 moles) of cyclobutane 1,2-bis(methylene amine). The reaction proceeded spontaneously with the evolution of heat. The resulting mono-salt, a clear, colorless liquid, was completely soluble in toluene at room temperature.

EXAMPLE III 35.4 grams (0.1 moles) of 2:2 molar 2-ethyl-2-butyl propane diol-1,3 borate was admixed with 100 ml. of toluene.

To this was added 1.8 grams (0.1 moles) of water, which reacted with the 2:2 molar glycol borate to form 0.2 moles of the corresponding 1:1 molar compound. The 1:1 molar glycol borate was not entirely soluble in toluene and produced a cloudy solution with suspended white solid particles.

Relying on the heat of reaction to provide a homogeneous reaction mixture, 11.4 grams (0.1 moles) of cyclobutane-1,2-bis(methylene amine) was added with stirring and under a nitrogen blanket. The resulting di-salt, a clear colorless product, became slightly cloudy at room temperature, indicating marginal solubility in toluene.

EXAMPLE IV

Under a nitrogen blanket, 57.0 grams (0.5 moles) of cyclobutane-1,2-bis(methylene amine) and 71.9 grams (0.5 moles) of 1:1 molar hexylene glycol were admixed under a nitrogen blanket. The reaction proceeded spontaneously with the evolution of heat. The resulting mono-salt was a clear, colorless liquid.

EXAMPLE V 30.4 grams (0.4 moles) of 1,2-propylene glycol and 24.8 grams (0.4 mole) of orthoboric acid were admixed with heating and stirring in a flask. Water of reaction was removed by blowing dry air into the reaction mixture. The effluent air was passed through an ice-cooled condenser where entrained moisture was condensed, collected and measured. With the collection of 14 ml. of water, the heating and air blowing was terminated.

To the resultant 1:1 molar 1,2-propylene glycol borate was added 45.6 grams (0.4 mole) of cyclobutane-1,2-bis (methylene amine). The reaction proceeded spontaneously in an air-excluded environment with the evolution of heat. The resultant mono-salt was a clear, viscous liquid.

EXAMPLE VI

The procedure of Example V was repeated using 1,3-propylene glycol. The resultant mono-salt was also a clear, liquid but more viscous than the 1,2-propylene glycol borate amine salt.

The amine glycol borate salts of this invention are particularly effective microbicides for all types of microbes normally found in the water bottoms of storage facilities for hydrocarbon distillate fuels such as gasoline, kerosine, jet fuels and diesel fuels. Such microbes include yeasts, molds, bacteria and fungi of which Diplococcus, Staphylococcus, Pseudomonas, Rhodotorula, Cylindorecephalum, Actinomyces and Aspergillus are examples.

In addition and in general the salts may be used to protect any organic fluid which (1) is susceptible to microbial degradation and (2) can solubilize at least a microbicidal concentration of salt. Typical organic fluids contemplated include perchloroethylene, hydraulic fluids (of the hydrocarbon and non-hydrocarbon types) and Stoddard solvent. Other organic fluids which might benefit from the inclusion of a microbicide will readily suggest themselves to those skilled in the art.

The amount of amine glycol borate salt required to sterilize a given storage facility will vary as functions of a number of interrelated factors, including the type of fuel or other organic fluid treated, the alkylene chain length of the glycol borate and the volume of water bottoms present. In general, however, a minimum of 10 parts of microbicide per million parts of treated material is required where the water bottoms constitute 0.1% by volume of treated material and a minimum of 60 parts of microbicide per million parts of treated material is required where the bottoms constitute 1% by volume of treated material. Usually microbicide concentrations in excess of 1 wt. percent of treated material cannot be justified economically.

To satisfy solubility requirements in hydrocarbon distillate fuels, the mono-salt should contain at least 10 carbon atoms, and the di-salt, at least 22 carbon atoms.

When used in treating gasoline, the boron content of these compounds can be expected to provide the improvement in surface ignition and rumble suppression long associated with hydrocarbon soluble, boron-containing gasoline additives.

The microbiological efficacy of the compounds of this invention was tested in the following manner:

The amine salt of Example IV was tested in kerosine at four concentrations; 30 p.p.m., 60 p.p.m., 90 p.p.m. and 120 p.p.m. A total of eighty 400 ml. samples were prepared in glass bottles, twenty at each concentration. Of each set of twenty samples, the ten even numbered ones were adjusted to pH 4 and the ten odd numbered ones were to pH 6, for reasons discussed hereinafter.

To each of the eighty samples was added 3.9 mls. of Bushnell-Haas (J. Bacteriology, vol. 41, p. 653 (1941)) medium (99.7% water and the rest nutritious salts) together with 0.1 mls. of an aqueous inoculant containing mixed organisms isolated from the water bottoms of fuel storage tanks. This provided each kerosine sample with a 1% water bottom.

The eighty samples were stored under dark, static conditions for various periods of time ranging from 2 to 30 weeks. The first sample at each concentration was removed from storage after two weeks whereupon an additional 0.1 ml. of inoculant was added. The samples were then placed on a slowly rotating wheel for 5 days after which time a 1 ml. portion of each of the water bottoms was removed and mixed with a 20 ml. portion of sterile nutrient agar heated to 45° C. in sterile Petri dishes. These mixtures were then cooled to room temperature whereupon the agar congealed. Each dish was then inverted and placed in an incubator maintained at 30° C. After incubation for 48 hours, the colonies were counted by standard procedures well known to those skilled in the art.

The second sample at each concentration was removed from storage after an additional two weeks and treated as described above. The third sample of each concentration remained in storage two weeks beyond the second sample, and so on through the 10th sample. Starting with the eleventh sample, the additional storage time between samples was reduced to one week. Thus, the twentieth sample was removed after a total storage time of 30 weeks.

The results of the test are shown in the table below:

| Amine-salt, p.p.m. | Sample Number | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| 30 | X | X | X | N | X | X | X | X | X | N | X | N | X | N | X | X | X | X | X | X |
| 60 | | | | | | | | X | | | | | | | | | X | | | |
| 90 | | | | | | | | | | | | | | X | | X | | N | | |
| 120 | | | | | | | | | X | | | | | | | X | | | | |

X = Microbiological growth.
Blank = Sterile sample.
N = No sample (lost through bottle breakage, etc.).

It is clear from these data that microbiological life was sustained in all the kerosine samples containing 30 p.p.m. of amine-salt. The samples containing 60, 90, and 120 p.p.m. of additive were, with very few exceptions, sterile. The scattered X's at these higher concentrations are considered to be random occurrences and are accorded no particular significance.

It was noted that the bacterial counts for the 30 p.p.m. samples did not increase with storage time. This indicates (1) the additive was stable over the 30-week test period, and (2) that the microbes did not adapt to the sub-lethal dose of additive.

Finally, the data show that in a system containing kerosine over 1% water bottoms, somewhere between 30 and 60 p.p.m. of the mono-salt of hexylene glycol borate cyclobutane-1,2 bis(methylene amine, is required to achieve a satisfactory level of biocidal activity.

As previously noted, half of the twenty samples of each concentration were adjusted to pH 4 and the other half to pH 6. The purpose of this was to determine whether the alkalinity of the amine salt rather than some other property was responsible for the biocidal potency of the additive. In this regard, it should be noted that pH values below 3.5 and above 8.5 are respectively too acid and too alkaline to favor microbiological life. Accordingly, if the equilibrium pH of the various water bottoms fell within the range of 3.5 to 8.5, then the microbiological activity would be due to some phenomenon other than pH. The results of this portion of the test are shown below:

| Adjusted pH of water bottom | P.p.m. additive | Equilibrium pH of water bottom |
|---|---|---|
| 6 | 30 | 7.2 |
| 6 | 60 | 7.4 |
| 6 | 90 | 8.5 |
| 6 | 120 | 8.7 |
| 4 | 30 | 6.2 |
| 4 | 60 | 7.2 |
| 4 | 90 | 8.5 |
| 4 | 120 | 8.5 |

Thus, with only one exception, the equilibrium pH values fell within the 3.5–8.5 range which is favorable to microbial life. It is particularly significant that the pH values for the sub-lethal 30 p.p.m. samples and the lethal 60 p.p.m. samples are both well within the critical range. Thus, it is apparent that the biocidal potency of the additive is due to some property other than pH.

We claim:
1. Compounds having the formula

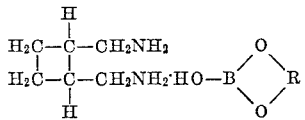

where R is selected from the group consisting of alpha and beta alkylene of 2–20 carbon atoms.

2. Compounds having the formula

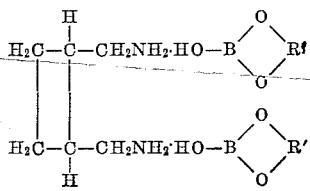

where R' is selected from the group consisting of alpha and beta alkylene of 2–20 carbon atoms.

References Cited by the Examiner
UNITED STATES PATENTS

| | | | |
|---|---|---|---|
| 2,824,039 | 2/1958 | Karsten | 167—30 |
| 2,883,412 | 4/1959 | Lowe | 260—462 |
| 3,030,197 | 4/1962 | Godar et al. | 44—72 |
| 3,031,283 | 4/1962 | Becker | 44—72 |
| 3,060,218 | 10/1962 | Willcockson | 260—462 |
| 3,062,708 | 11/1962 | Updegraff | 167—30 |

CHARLES B. PARKER, *Primary Examiner.*

REYNOLD J. FINNEGAN, DELBERT R. PHILLIPS,
*Assistant Examiners.*